Sept. 11, 1951  E. M. S. McWHIRTER ET AL  2,567,226
ELECTRIC REMOTE-CONTROL SYSTEM
Filed Aug. 7, 1947
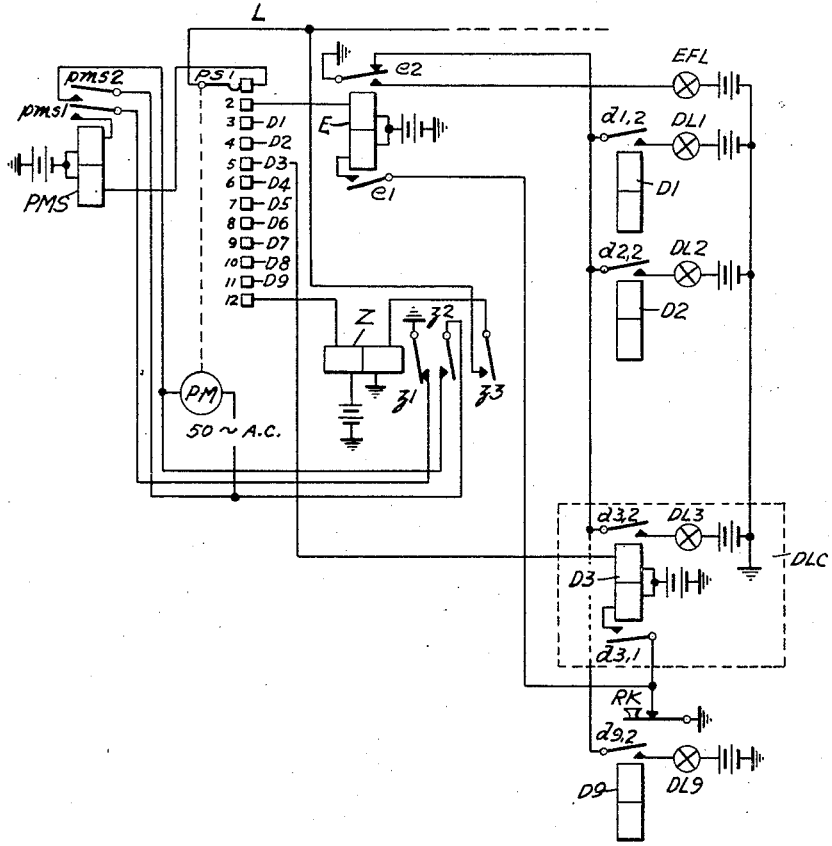
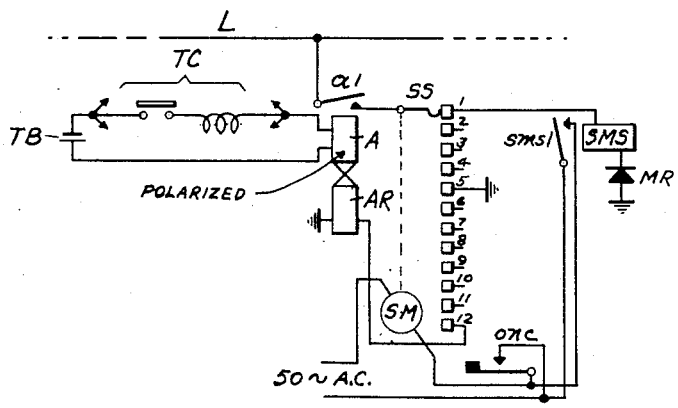
INVENTORS
ERIC M. S. McWHIRTER
HUGH J. WARD
BY
ATTORNEY Patented Sept. 11, 1951

2,567,226

UNITED STATES PATENT OFFICE 2,567,226

ELECTRIC REMOTE-CONTROL SYSTEM

Eric Malcolm Swift McWhirter and Hugh Jennings Ward, London, England, assignors to International Standard Electric Corporation, New York, N. Y.

Application August 7, 1947, Serial No. 767,200
In Great Britain June 2, 1939

Section 1, Public Law 690, August 8, 1946
Patent expires June 2, 1959

4 Claims. (Cl. 177—353)

This invention relates to electric remote control and/or supervisory systems, such as may be used in an electric power distribution network for unattended substations.

The known methods of supervisory signalling in such systems involve fairly elaborate coding system (more especially in the case of party-line working), and are expensive when applied to secondary distribution substations housing a relatively small amount of switchgear.

The present invention provides a signalling arrangement involving little apparatus, thus giving a considerable economy.

In accordance with this invention an electric remote-control and/or supervisory system is characterised in that any one of a plurality of unattended secondary stations or groups of secondary stations can be distinguished at a common primary position by the time-spacing between a pair of signals transmitted from the secondary station to a common receiving equipment. The time spacing may be derived in a number of ways, such as 50-cycle mains, regulated clocks, condenser discharge circuits, pendulums, etc.

In order that the invention may be clearly understood, reference will be made to the accompanying drawing, which shows one way in which the invention may be applied to the supervision of a number of unattended secondary substations on an electrical power distribution network. In the drawing:

Figure 1 is a circuit diagram pertaining to a primary (attended) substation on the network; and Figure 2 is a circuit diagram pertaining to a secondary (unattended) substation.

General

The line L is connected, at the primary station to the wiper of a selector switch PS, and at each individual secondary station through normally open contacts $a1$ of a relay A to the wiper of a similar selector switch SS. The wipers of the two selectors S are normally standing on their contacts No. 1, which lead, at the primary station to a starting relay PMS for a synchronous motor PM driving the selector PS, and at the secondary station to a starting relay SMS for a similar motor SM driving the secondary selector SS. Thus closing of the contacts $a1$ by the tripping of a circuit breaker at any individual secondary station will complete the circuits for both motors, the one at the primary and the one at the individual secondary. Each of the secondary stations is distinguished from all the others by having one of its contacts 3—11 in its selector S permanently earthed; thus when the two selectors, stepping in unison, reach that contact, a circuit is completed to energise that one of the relays D which is particular to that secondary station. The selectors continue their movement, sweeping all the contacts and returning to their home positions on contacts No. 1.

Regular operation

When a breaker trips at a secondary substation (Fig. 2) the current from the tripping battery TB in its tripping circuit TC passes through one winding of a polarised relay A (alternatively a mechanically latching relay) causing this to operate and at $a1$ to connect the wiper of the 12-position switch SS with the line L.

The current flows from earth at the secondary substation via a metal rectifier MR, winding of relay SMS, contact 1 and wiper of the selector switch SS, front contact $a1$ to the common line L and at the primary substation (Fig. 1) from the common line L via wiper and contact 1 of the selector switch PS, relay PMS, and battery to earth.

Relays PMS and SMS operate (PMS locking on its second winding over contacts $pms1$ and $z1$ to ground) and at $pms2$ and $sms1$ close the circuits for their respective motors PM and SM. These motors once started, are maintained in operation, the one by reason of the locking of relay PMS, and the other by the closing of the off-normal contacts $onc$. Being synchronous type motors, and both fed from a 50 v. A. C. supply, they drive the selector switches S over their contacts at equal speeds.

The secondary station shown in Fig. 2 may be referred to as No. 3, since its switch SS has its third contact out of contacts Nos. 3–11. In other words the fifth contact of the entire bank of twelve, permanently earthed. Consequently when the selector switches reach their contacts No. 5 a circuit is completed; (Fig. 2), earth, contact No. 5 of SS, wiper $a1$ front, L, (Fig. 1) wiper of PS, contact No. 5, upper winding of relay D3, battery. Hence the relay D3, distinguishing secondary station No. 3, operates, and locks over its contacts $d3$, 1 and a restoring key RK; at the same time, in a distinguishing lamp circuit DLC, the distinctive relay D3 lights up the lamp DL3.

Both selectors PS and SS continue until they reach their contacts No. 12 when current flows from earth at the primary station via battery, left winding of relay Z, contact 12 and wiper of the selector switch to the common line L, and at the secondary station from the common line L via a1, wiper and contact 12 of the selector switch SS, resetting-winding AR for relay A to earth.

At the primary substation relay Z operates and locks with its two windings in series. At z1 this relay opens the holding circuit of relay PMS; but before the motor circuit is opened at pms2 the contacts z2 are closed. Over z3 the relay Z holds, until the selector switch is again normal, and then releases. At the secondary substation relay A resets, the motor SM stops the selector SS to position No. 1, the off-normal contacts open, and the circuit is again normal.

The indications which are stored upon the relays D at the primary substation are cancelled in the instance shown by the momentary depression of the reset key RK.

Double connection

Should the A relays at two secondary substations be operated at the same moment, both alarms will be signalled in a single cycle of the selector switch at the primary substation, the direct earths on the selector switches at the secondary substations operating the appropriate D relays at the primary substation in turn.

Busy

Should a signal be in course of transmission when an A relay operates, that substation will wait until the selector switch at the primary substation is again on contact 1; for until then, the metal rectifier MR prevents relay SMS from operating to the battery applied to the line at the primary substation through the successive D relays. It is to be noted that the battery associated with relay PMS is arranged with respect to the line L in opposite polarity to all the others.

Earth

Should there be a permanent earth on the line, relay PMS will be permanently operated and the selector PS at the primary substation will rotate continuously. Contact No. 2 in the selector switches is never used to distinguish a secondary substation, and at the primary station is connected to a relay E which will thus only operate when there is an earth somewhere on the line. When it does so it disables all the station lamp sets and lights the earth fault lamp EFL. In this condition no secondary substations can start to signal, since the faulty earth short-circuits the SMS relays.

It will be noted as one of the advantages of this arrangement that the signals are stored by reason of the holding of relay A, should the primary station be engaged, or should the common line L be earthed.

The invention may take many other forms than that described specifically, by way of example. For instance, the common line L, shown as a single conductor with an earth return, may consist of two conductors, in which case the provision described above against faulty earth could readily be made to cover short-circuit. Again the DL relays may be used for some other purpose than that of lighting signal lamps; thus where the primary station is itself unattended the DL relay could serve to transmit a signal to get a further point.

What is claimed is:

1. An electrical signalling system comprising a primary station and a plurality of secondary stations, means including a two path line for electrically interconnecting said primary station and said secondary stations, a plurality of selector switches and driving means therefor, one at said primary station and one at each of said secondary stations, said switches having a wiper and a plurality of switch positions including normal and off-normal positions, a plurality of load circuits, one at each of said secondary stations, a first plurality of relays, one associated with each of said secondary stations, each adapted to connect the wiper of the switch of its associated station to said line upon variation of the load circuit at said last mentioned station, a source of potential connected serially between one path of said line and the normal position of the switch at said primary station, a second plurality of relays, one associated with each of said secondary stations, each comprising an energizing winding and a rectifier serially connected between one path of said line and the normal position of the switch at respective of said secondary stations, said last-mentioned relays each adapted to control operation of the switch driving means at its respective secondary station, whereby the switch at said primary station connects said source to the energizing windings of said second relays at secondary stations having variations of the respective load circuit thereat whilst said last-mentioned switch is in normal position.

2. An electrical signalling system according to claim 1 wherein said primary station further comprises relay means responsive to a circuit condition in said interconnecting means for initiating operation of said selector switch in said primary station and means for operating a predetermined one of said signal indicating means including one of the off-normal positions of said selector switch.

3. An electrical signalling system comprising a primary station and a plurality of secondary stations, means including a two-path line for electrically interconnecting said primary station and said secondary stations, cyclically operating synchronous switching means at said primary station and at each of said secondary stations comprising means responsive to a predetermined condition at any of said secondary stations for initiating operation of the switching means both at the secondary station having said predetermined condition and at said primary station and means for transmitting a signal to said primary station from said last mentioned secondary station at a predetermined interval after the beginning of a cycle of operation of said switching means, a plurality of signal indicating means at said primary station, means for operating a predetermined one of said signal indicating means under control of the transmitted signal from said last-mentioned secondary station, means to prevent operation of the switching means at other of said secondary stations having predetermined conditions until after completion of one cycle of operation of the switching means at said primary station initiated in response to the predetermined condition at said first mentioned secondary station, means at said primary station responsive to a fault in said interconnecting means for initiating operation of said switching means in said primary station, means for operating a predetermined one of said signal indicating means a predetermined interval of time after the beginning of the cycle of operation of said switching means, and means for operating different of said signal indicating means during a subsequent cycle of said switching means at said primary station in response to a signal transmitted by any of said secondary stations having a predetermined condition.

4. An electrical signalling system comprising a primary station and a plurality of secondary stations, means including a two-path line for electrically interconnecting said primary station and said secondary stations, a plurality of selector switches each having a plurality of positions including normal and off-normal positions and separate driving means for each of said switches, one of said switches at said primary station and at each of said secondary stations, means to connect a first path of said line to the normal position of the selector switch at said primary station, a plurality of first relays, each associated with a different one of said secondary stations, each adapted to operate in response to a predetermined condition occurring at its associated secondary station and each adapted to connect the selector switch at its associated secondary station with the first path of said line, a two-terminal source of potential at said primary station having one terminal connected to a second path of said line, relay means at said primary station having an energizing winding serially connected between the other terminal of said source and the normal position of the selector switch at said primary station, said relay means adapted to control operation of the driving means of the selector switch at said primary station, a plurality of signal indicating means each connected to different off-normal positions of the selector switch at said primary station, different of said off-normal positions assigned to different of said secondary stations, a plurality of second relays, each associated with a different one of said secondary stations, each having an energizing winding, a plurality of rectifier devices, each associated with a different one of said secondary stations, each rectifier and each relay energizing winding serially connected between the second path of said line and the normal position of the selector switch at their associated secondary station, said rectifiers poled to pass current solely from said source, means at each of said secondary stations for applying a predetermined electrical condition to a particular position of the selector switch associated with said secondary station, such particular position corresponding to the position assigned to the indicating means identified with each of said secondary stations on the selector switch at said primary station, said last named means adapted to actuate the indicating means at said primary station upon the application of a predetermined electrical condition at said secondary station, each of said second relays adapted to control the driving means associated with the selector switch at its associated secondary station.

ERIC MALCOLM SWIFT McWHIRTER.
HUGH JENNINGS WARD.

REFERENCES CITED

The following references are of record in the file of this patent:

UNITED STATES PATENTS

| Number | Name | Date |
| --- | --- | --- |
| 405,831 | Dewey | June 25, 1889 |
| 1,185,919 | Long | June 6, 1916 |
| 1,587,122 | Harlow | June 1, 1926 |
| 1,632,106 | Zogbaum | June 14, 1927 |
| 1,771,234 | Remington | July 22, 1930 |
| 1,786,524 | Durbin | Dec. 30, 1930 |
| 2,082,464 | Preston | June 1, 1937 |
| 2,424,571 | Lang | July 29, 1947 |